(12) United States Patent
Matsuura

(10) Patent No.: US 8,396,837 B2
(45) Date of Patent: Mar. 12, 2013

(54) INFORMATION PROCESSING APPARATUS

(75) Inventor: Masatsugu Matsuura, Tokyo (JP)

(73) Assignee: NEC Corporation, Tokyo (JP)

( * ) Notice: Subject to any disclaimer, the term of this patent is extended or adjusted under 35 U.S.C. 154(b) by 41 days.

(21) Appl. No.: 13/129,757

(22) PCT Filed: Oct. 14, 2009

(86) PCT No.: PCT/JP2009/005336
§ 371 (c)(1),
(2), (4) Date: May 17, 2011

(87) PCT Pub. No.: WO2010/070794
PCT Pub. Date: Jun. 24, 2010

(65) Prior Publication Data
US 2011/0238639 A1    Sep. 29, 2011

(30) Foreign Application Priority Data

Dec. 19, 2008  (JP) ................................ 2008-323077

(51) Int. Cl.
*G06F 7/00*    (2006.01)
(52) U.S. Cl. .......................... 707/661; 707/664; 707/698
(58) Field of Classification Search .................. 707/661, 707/664, 698
See application file for complete search history.

(56) References Cited

U.S. PATENT DOCUMENTS 7,600,125 B1 *  10/2009  Stringham ................... 713/176
2006/0294164 A1 *  12/2006  Armangau et al. .......... 707/205

FOREIGN PATENT DOCUMENTS

| JP | 2-1052 A | 1/1990 |
| JP | 9-62697 A | 3/1997 |
| JP | 2007234026 A | 9/2007 |
| WO | 2006094366 A | 9/2006 |

OTHER PUBLICATIONS

International Search Report for PCT/JP2009/005336 mailed Nov. 10, 2009.
H. Yuki, "Yuki Hiroshi no C# de Manabu Algorithm to Data Kozo Dai 7 Kai 'Hashing'", C Magazine, vol. 17, No. 11, Nov. 2005, pp. 103-110.

* cited by examiner

*Primary Examiner* — Vincent Boccio

(57) ABSTRACT

When accepting a write request including a data, an apparatus 100A acquires a first hash value based on a first hash function and, meanwhile, acquires a second hash value based on a second hash function. When a storage device 110A has not stored the acquired first hash value and second hash value in correlation with each other, the apparatus correlates the data, the first hash value, the second hash value, and information of referenced times, and then stores the correlated items into the storage device. On the other hand, when the storage device has stored the acquired first hash value and second hash value in correlation with each other, the apparatus changes the information of referenced times stored in correlation with the first hash value and the second hash value so as to add one to the number of times denoted by the information of referenced times.

9 Claims, 16 Drawing Sheets

| HASH FUNCTION | NONUSE FLAG | CELL AREA |
|---|---|---|
| hashA | | cell1, cell3 |
| hashB | | cell1, cell2 |
| hashC | | cell2, cell3 |
| hashD | | |
| ⋮ | ⋮ | ⋮ |

| NODE NUMBER | FIRST SEGMENT NUMBER | DIRECTORY FLAG | FILE NAME | GENERATION DATE |
|---|---|---|---|---|
| 0 | 0 | 1 | | 2008/06/01 |
| 1 | 0 | 1 | home | 2008/06/01 |
| 50 | 0 | 1 | foo | 2008/06/02 |
| 300 | 101 | 0 | bar | 2008/06/11 |

Fig.5

| NODE NUMBER | PARENT NODE NUMBER |
|---|---|
| 0 | 0 |
| 1 | 0 |
| 50 | 1 |
| 300 | 50 |

Fig.6

| NODE NUMBER | SEGMENT NUMBER | SUBSEQUENT SEGMENT NUMBER |
|---|---|---|
| 300 | 101 | 102 |
| 300 | 102 | 103 |
| 300 | 103 | 104 |
| 300 | 104 | 105 |
| 300 | 105 | 106 |
| 300 | 106 | NULL |

Fig.7

| SEGMENT NUMBER | FIRST HASH VALUE | SECOND HASH VALUE | THIRD HASH VALUE |
|---|---|---|---|
| 101 | HA1 | HB1 | HC1 |
| 102 | HA2 | HB2 | HC2 |
| 103 | HA3 | HB3 | HC3 |
| 104 | HA4 | HB4 | HC4 |
| 105 | HA5 | HB5 | HC5 |
| 106 | HA6 | HB6 | HC6 |

| HASH FUNCTION | NONUSE FLAG | CELL AREA |
|---|---|---|
| hashA | | cell1, cell3 |
| hashB | | cell1, cell2 |
| hashC | | cell2, cell3 |
| hashD | | ... |
| ... | | |

Fig.10

| FIRST HASH VALUE | SECOND HASH VALUE | INFORMATION OF REFERENCED TIMES | ADDRESS |
|---|---|---|---|
| HA1 | HB1 | 1 | AD1 |
| HA2 | HB2 | 1 | AD2 |
| HA3 | HB3 | 1 | AD3 |
| HA4 | HB4 | 1 | AD4 |
| HA5 | HB5 | 1 | AD5 |
| HA6 | HB6 | 1 | AD6 |

Fig.17

| FIRST HASH VALUE | SECOND HASH VALUE | THIRD HASH VALUE |
|---|---|---|
| HA1 | HB1 | HC1 |
| HA2 | HB2 | HC2 |
| HA3 | HB3 | HC3 |
| HA4 | HB4 | HC4 |
| HA5 | HB5 | HC5 |
| HA6 | HB6 | HC6 |

FILE
- SEGMENT S1
- SEGMENT S2
- SEGMENT S3
- SEGMENT S4
- SEGMENT S5
- SEGMENT S6

INFORMATION PROCESSING APPARATUS

The present application is the National Phase of PCT/JP2009/005336, filed Oct. 14, 2009, which claims priority from Japanese Patent Application No. 2008-323077, filed on Dec. 19, 2008 in Japan, the disclosure of which is incorporated herein by reference in its entirety.

TECHNICAL FIELD

The present invention relates to information processing apparatuses for storing data into storage devices.

BACKGROUND ART

There are information processing apparatuses known for accepting a write request including a data and storing the data included in the accepted write request into a storage device.

As one of the information processing apparatuses of this kind, the information processing apparatus described in Patent Document 1 acquires a hash value by inputting the data to a hash function at the time of storing a data into a storage device. Then, when the storage device has not stored a hash value identical to the acquired hash value, the information processing apparatus correlates the data, the hash value, and information of referenced times denoting the number of times the data has been referenced; then, it stores the correlated items into the storage device.

On the other hand, when the storage device has stored a hash value identical to the acquired hash value, the information processing apparatus changes the information of referenced times correlated with the hash value and stored in the storage device such as to add one to the number of times denoted by the information of referenced times. According to this information processing apparatus, because it is possible to avoid repeatedly storing the identical data into the storage device, it is possible to reduce the data amount stored in the storage device.

[Patent Document 1] JP 2007-234026 A

However, there are times when the hash function outputs an identical hash value even though different data are inputted (collision occurs in the hash value). Therefore, in the above information processing apparatus, when collision has occurred in a hash value, there is a problem that two different data are mistakenly recognized as an identical data to give rise to occurrence of the case that one of the data disappears.

Further, supposing that the above information processing apparatus is configured to detect whether or not data are identical by directly comparing at least parts of two data of an identical hash value, there is another problem that the processing load becomes too heavy on the information processing apparatus.

SUMMARY

Accordingly, an exemplary object of the present invention is to provide an information processing apparatus capable of solving the above problem that "when collision occurs in a hash value, it is not possible to detect whether or not the data are identical without causing the processing load to become too heavy".

In order to achieve the exemplary object, in accordance with an aspect of the present invention, an information processing apparatus includes: a write request acceptance means for accepting a write request including a data; a hash value acquisition means for carrying out a process to acquire a first hash value by inputting the data included in the write request to a first hash function and to acquire a second hash value by inputting the data to a second hash function, when the write request is accepted; and a storage processing means for correlating the data included in the write request, the acquired first hash value, the acquired second hash value, and information of referenced times denoting a predetermined initial value as the number of times the data has been referenced, and newly storing the correlated items into a storage device when the storage device has not stored a first hash value identical to the acquired first hash value and a second hash value identical to the acquired second hash value in correlation with each other, whereas changing the information of referenced times stored in correlation with the first hash value and the second hash value such as to add one to the number of times denoted by the information of referenced times when the storage device has stored a first hash value identical to the acquired first hash value and a second hash value identical to the acquired second hash value in correlation with each other.

Further, in accordance with another aspect of the present invention, an information processing system includes: a storage device; a write request acceptance means for accepting a write request including a data; a hash value acquisition means for carrying out a process to acquire a first hash value by inputting the data included in the write request to a first hash function and to acquire a second hash value by inputting the data to a second hash function, when the write request is accepted; and a storage processing means for correlating the data included in the write request, the acquired first hash value, the acquired second hash value, and information of referenced times denoting a predetermined initial value as the number of times the data has been referenced, and newly storing the correlated items into the storage device when the storage device has not stored a first hash value identical to the acquired first hash value and a second hash value identical to the acquired second hash value in correlation with each other, whereas changing the information of referenced times stored in correlation with the first hash value and the second hash value such as to add one to the number of times denoted by the information of referenced times when the storage device has stored a first hash value identical to the acquired first hash value and a second hash value identical to the acquired second hash value in correlation with each other.

Further, in accordance with still another aspect of the present invention, an information processing method includes: accepting a write request including a data; carrying out a process to acquire a first hash value by inputting the data included in the write request to a first hash function and to acquire a second hash value by inputting the data to a second hash function, when the write request is accepted; and correlating the data included in the write request, the acquired first hash value, the acquired second hash value, and information of referenced times denoting a predetermined initial value as the number of times the data has been referenced, and newly storing the correlated items into a storage device when the storage device has not stored a first hash value identical to the acquired first hash value and a second hash value identical to the acquired second hash value in correlation with each other, whereas changing the information of referenced times stored in correlation with the first hash value and the second hash value such as to add one to the number of times denoted by the information of referenced times when the storage device has stored a first hash value identical to the acquired first hash value and a second hash value identical to the acquired second hash value in correlation with each other.

Further, in accordance with still another aspect of the present invention, a computer program includes instructions for causing an information processing apparatus to realize: a write request acceptance means for accepting a write request including a data; a hash value acquisition means for carrying out a process to acquire a first hash value by inputting the data included in the write request to a first hash function and to acquire a second hash value by inputting the data to a second hash function, when the write request is accepted; and a storage processing means for correlating the data included in the write request, the acquired first hash value, the acquired second hash value, and information of referenced times denoting a predetermined initial value as the number of times the data has been referenced, and newly storing the correlated items into a storage device when the storage device has not stored a first hash value identical to the acquired first hash value and a second hash value identical to the acquired second hash value in correlation with each other, whereas changing the information of referenced times stored in correlation with the first hash value and the second hash value such as to add one to the number of times denoted by the information of referenced times when the storage device has stored a first hash value identical to the acquired first hash value and a second hash value identical to the acquired second hash value in correlation with each other.

Being configured in the above manner, the present invention is capable of detecting whether or not the data are identical when collision has occurred in a hash value, while preventing the processing load from becoming too heavy.

BRIEF DESCRIPTION OF DRAWINGS

FIG. 5 is a node relationship table stored by the information processing apparatus shown in FIG. 1;

FIG. 6 is a file composition segment table stored by the information processing apparatus shown in FIG. 1;

FIG. 7 is a segment hash management table stored by the information processing apparatus shown in FIG. 1;

FIG. 10 is a segment management table stored by the information processing apparatus shown in FIG. 1;

FIG. 17 is an explanatory diagram conceptually showing segments composing a file, and hash values acquired for each segment;

EXEMPLARY EMBODIMENTS

Hereinbelow, referring to FIGS. 1 to 20, descriptions will be made with respect to exemplary embodiments of an information processing apparatus, an information processing system, an information processing method and a computer program in accordance with the present invention.

A First Exemplary Embodiment

Figure 1:
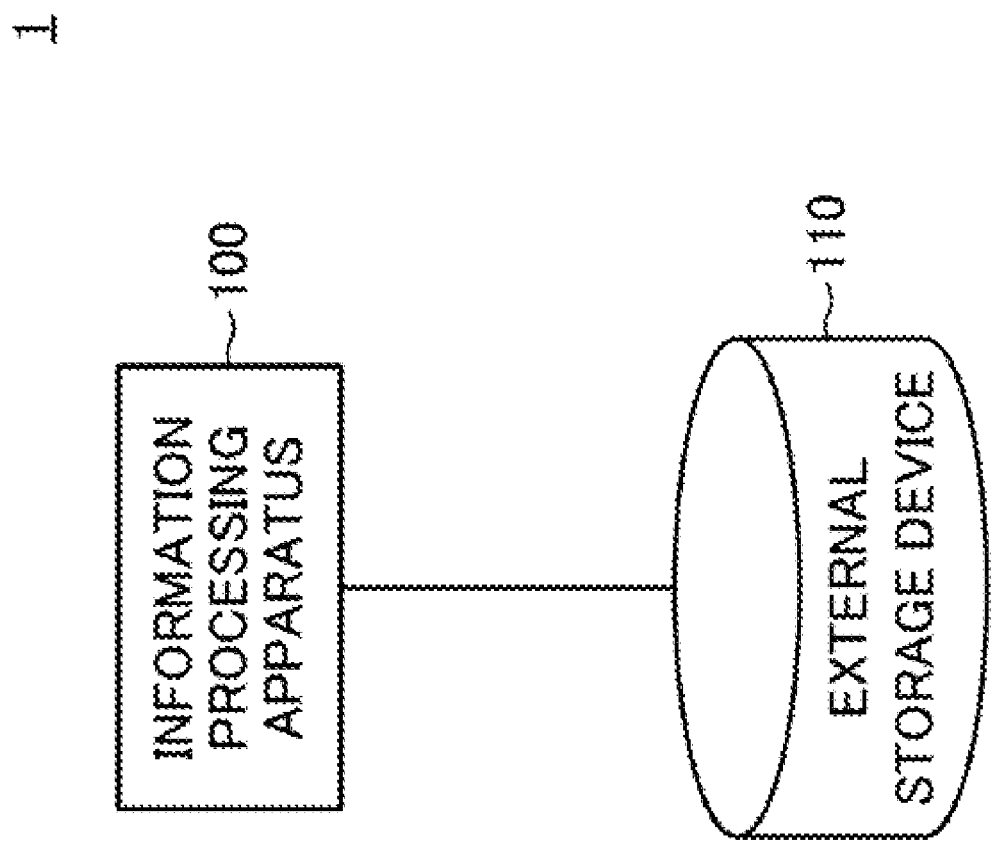
FIG. 1 is a diagram showing a schematic configuration of an information processing system in accordance with an exemplary embodiment of the present invention.

As shown in FIG. 1, an information processing system 1 according to a first exemplary embodiment includes an information processing apparatus 100 and an external storage device 110 (storage device).

The information processing apparatus 100 includes a Central Processing Unit (CPU, not shown) and an internal storage device (memories, and hard disk drive: HDD). The information processing apparatus 100 is configured to fulfill a function which will be described hereinafter by the CPU executing a computer program (an operating system, for example) stored in the internal storage device.

The external storage device 110 includes a storage medium for storing (retaining) information. The external storage device 110 stores information into the storage medium according to write instructions from the information processing apparatus 100. Further, the external storage device 110 transmits information stored in the storage medium to the information processing apparatus 100 according to read instructions from the information processing apparatus 100.

Figure 2:
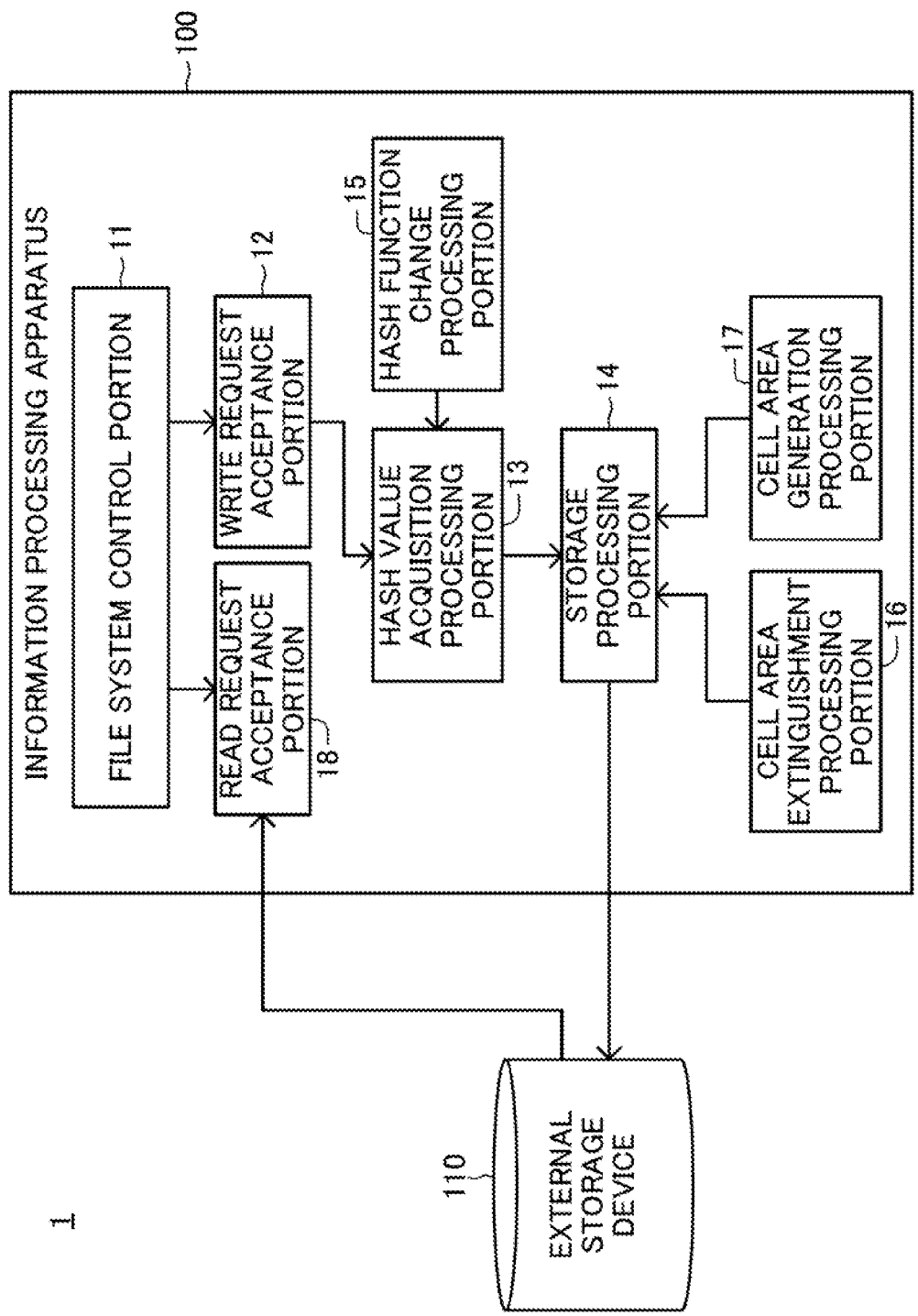
FIG. 2 is a block diagram showing an outline of a function of the information processing system shown in FIG. 1.

FIG. 2 is a block diagram depicting a function of the information processing system 1 configured as described hereinabove. This function is fulfilled by the CPU of the information processing apparatus 100 executing the computer program and the like stored in the internal storage device.

The function of the information processing apparatus 100 includes a file system control portion 11, a write request acceptance portion (write request acceptance means) 12, a hash value acquisition processing portion (hash value acquisition processing means) 13, a storage processing portion (storage processing means) 14, a hash function change processing portion (hash function change processing means) 15, a cell area extinguishment processing portion (cell area extinguishment processing means) 16, a cell area generation processing portion (cell area generation processing means) 17, and a read request acceptance portion (read request acceptance means) 18.

The file system control portion 11 provides a function for a computer program (an application program and the like, for example) to be executed by the information processing apparatus 100 to deal with a data stored in the external storage device 110 as a file (to read a file or to write a file, for example).

Figures 3, 4:
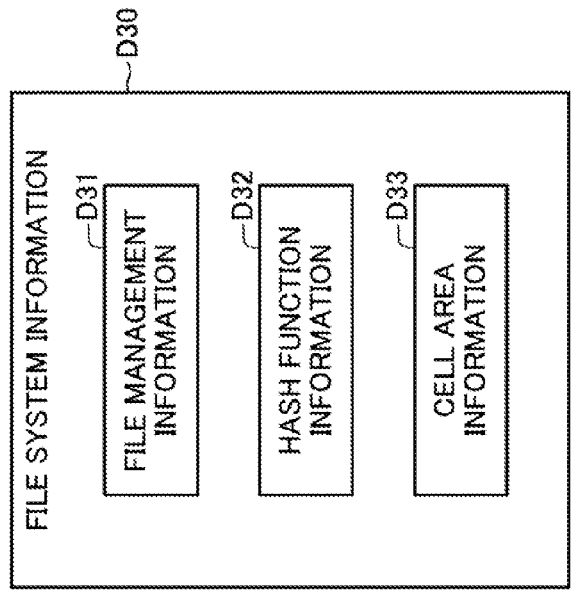
FIG. 3 shows file system information stored by an information processing apparatus shown in FIG. 1.
FIG. 4 is a file meta-information table stored by the information processing apparatus shown in FIG. 1.

The file system control portion 11 stores file system information D30 shown in FIG. 3 into the internal storage device. The file system information D30 includes file management information D31, hash function information D32, and cell area information D33.

The file management information D31 includes file meta-information. The meta-information includes information denoting the position (path) in the file system, access right control, generation date, updated date and the like of each file. Further, the file management information D31 includes information for correlating a file with segments. Here, the segments are data blocks of dividing a series of data dealt with as a file (the data composing the file) according to each predetermined data size.

In this exemplary embodiment, the file management information D31 includes a file meta-information table shown in FIG. 4, a node relationship table shown in FIG. 5, a file composition segment table shown in FIG. 6, and a segment hash management table shown in FIG. 7.

The file meta-information table includes a plurality of pieces of information composed of node (i-node) number, first segment number, directory flag, file name, and generation date as shown in FIG. 4. Further, the file meta-information table may also include other information such as updated date, access right, and the like.

The node number is the information for identifying files in the file system for managing files. The file system has a hierarchical structure (a tree structure in this exemplary embodiment). That is, the file system has files and directories, and directories are special files for storing files and/or directories. Hereinbelow in the present description, "da/fa" indicates that the file fa is stored in the directory da. Further, in this case, the directory da is called a "parent", and the file fa is called a "child".

In the file meta-information table of this exemplary embodiment, the node number is configured to include the information having "0", "1", "50", and "300", respectively. Further, a file identified by the node number "0" is the file positioned in the uppermost hierarchy in the file system (the parent of all files, that is, the root file).

The directory flag is the information indicating whether or not a file is a directory as a special file. The directory flag indicates that the file is a directory if it is "1", and an ordinary file (that is, denoting a data) if it is "0".

The first segment number is a segment number for identifying the segment positioned at the first place in a file. The segment number is the information for identifying segments. Further, in this exemplary embodiment, directories do not have segments. Therefore, the first segment number for a directory is set at "0". When a directory has a data, the segment number may also be set at a number other than "0".

The file name is the information denoting the name of a file (or a directory) identified by the node number. When a computer program (an application program or the like, for example) executed by the information processing apparatus 100 accesses the file system (that is, reads or writes a file), the file name specifies the object file to be accessed.

As shown in FIG. 5, the node relationship table includes a plurality of pieces of information composed of the node number, and parent node number for identifying the file storing the file identified by a node number. That is, the node relationship table is the information denoting the hierarchical structure of the files (parent-child relationship). Since there is no file storing the root file, "0" is set to the parent node number correlated with the node number of the root file.

In this exemplary embodiment, there are files identified by the node number "1" in the hierarchy right below the root file. It is possible to denote the hierarchical structure as "0/1" with the node number, or as "/home" with the file name.

As shown in FIG. 6, the file composition segment table includes a plurality of pieces of information composed of the node number, the segment number, and subsequent segment number which is the segment number for identifying the subsequent segment to the segment identified by the segment number in the file identified by a node number.

In this exemplary embodiment, the file identified by the node number "300" is composed of six segments. That is, the file is composed of the data aligned in the order of the segments identified subsequently by the segment numbers from "101" to "106".

As shown in FIG. 7, the segment hash management table includes a plurality of pieces of information composed of the segment number, first hash value, second hash value, and third hash value. Each of the first hash value to the third hash value is a value calculated by utilizing a hash function which will be described hereinafter.

The hash function information D32 includes information denoting each of a plurality of hash functions. Each hash function outputs a hash value smaller in data size than the data by converting an inputted data. Each hash function is configured to cause an inputted data and the outputted hash value to correspond to n to 1 (n is an integer including 1).

In this exemplary embodiment, a hash function HA ("hash A") is configured to output a hash value outputted from a basic hash function by inputting a data composed of an inputted data and a predetermined first additional data to the basic hash function (the first basic hash function) which is a hush function as the base.

In the same manner, a hash function HB ("hash B") is configured to output a hash value outputted from a basic hash function by inputting a data composed of an inputted data and a predetermined first additional data to the basic hash function (the second basic hash function).

Further, the first basic hash function and the second basic hash function may be different basic hash functions. In such a case, it is possible to reduce the probability of collision in hash values occurring in both the first hash value and the second hash value for a certain data.

Further, a hash function HC ("hash C") is different from the hash function HB only in the aspect of utilizing a third additional data different from either of the first additional data and the second additional data instead of utilizing the second additional data. In the same manner, a hash function HD ("hash D") is different from the hash function HC only in the aspect of utilizing a fourth additional data different from each of the first additional data, the second additional data and the third additional data instead of utilizing the third additional data.

In this manner, the information processing apparatus 100 configures a plurality of hash functions by changing the additional data. By virtue of this, it is possible to easily prepare a plurality of hash functions.

Further, the hash functions HA to HD may be configured based on algorithms different from each other.

Figures 8, 9:
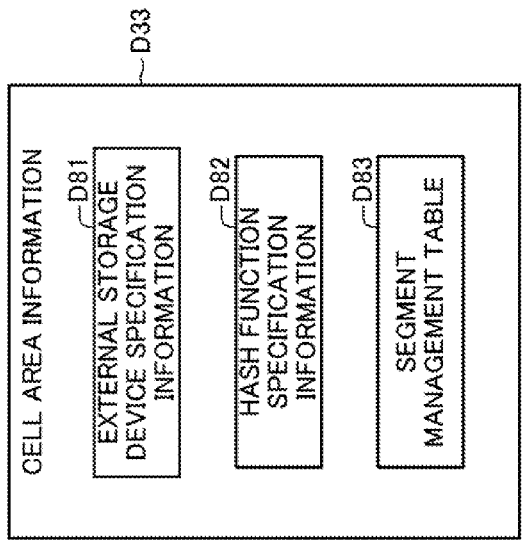
FIG. 8 shows cell area information stored by the information processing apparatus shown in FIG. 1.
FIG. 9 is a hash function table stored by the information processing apparatus shown in FIG. 1.
Figure 11:
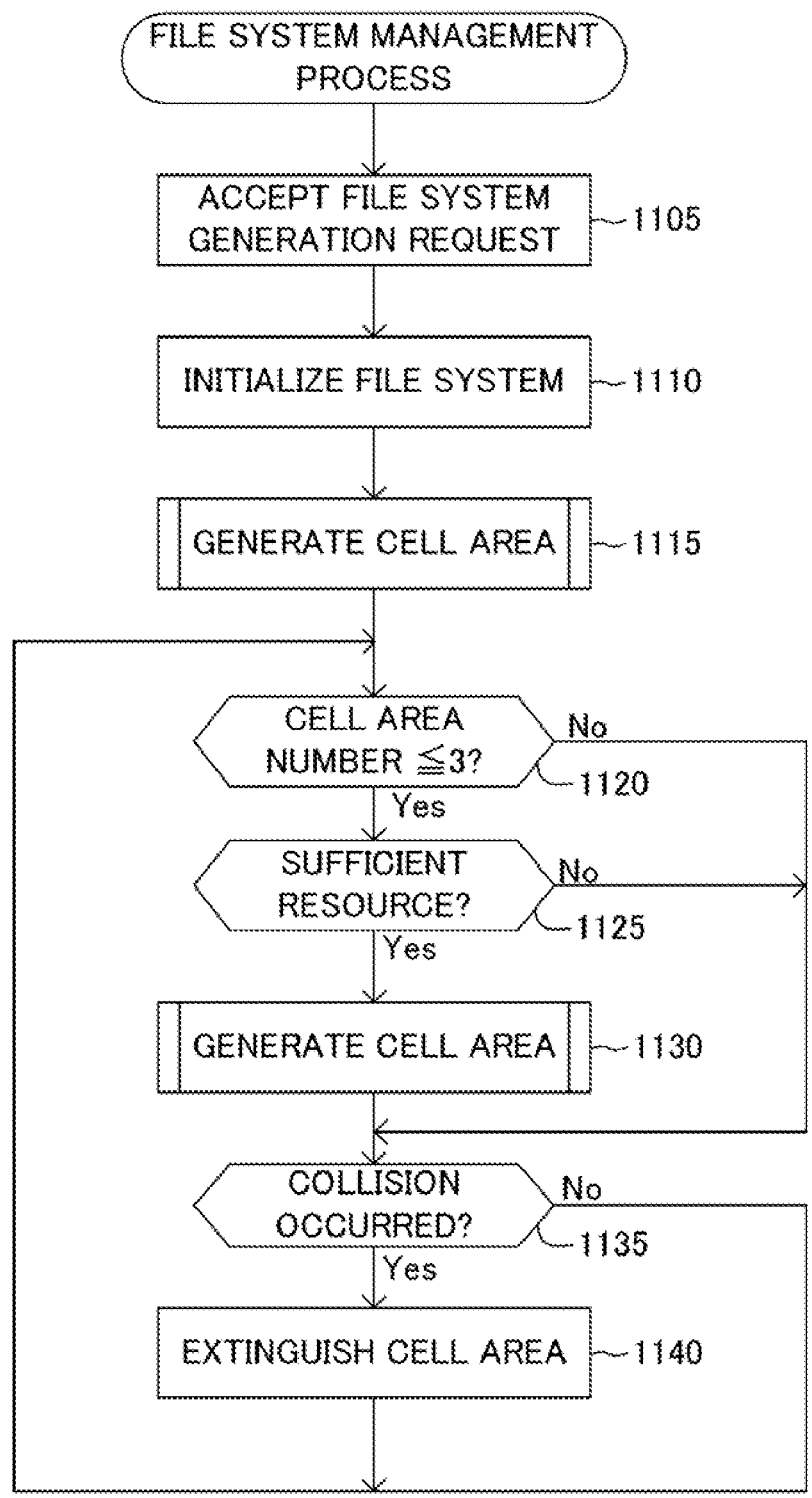
FIG. 11 is a flowchart showing a computer program to be executed by the information processing apparatus shown in FIG. 1 for managing a file system.

As shown in FIG. 8, the cell area information D33 includes area specification information D81, hash function specification information D82, and a segment management table D83 correlated with each cell area. In this exemplary embodiment, the cell area information D33 includes information for specifying three cell areas composed of a first cell area to a third cell area.

The area specification information D81 includes information for specifying the external storage device 110 and information for specifying the storage area in the external storage device 110 (the range of the storage positions, i.e., addresses), correlated with each cell area.

The hash function specification information D82 includes information correlated with each cell area for specifying a hash function. In this exemplary embodiment, the hash function specification information D82 includes a hash function table shown in FIG. 9.

The hash function table includes a plurality of pieces of information composed of the information for specifying a hash function, nonuse flag, and information for specifying the cell areas utilizing the hash function. The nonuse flag is information indicating whether or not to prohibit utilization of a hash function. If a value is set in the nonuse flag, it indicates that the hash function is prohibited from utilization. On the other hand, if no value is set in the nonuse flag, it indicates that the hash function is allowed to be utilized.

In this exemplary embodiment, the information processing apparatus 100 stores the segment management table D83 into the first area of the respective cell areas. The segment management table D83 is created when the cell areas are set anew. As shown in FIG. 10, the segment management table D83 correlated with the first cell area includes a plurality of pieces of information composed of the first hash value, the second hash value, information of referenced times, and address. Each piece of the information in the segment management table D83 is correlated with the segment number via the first hash value, the second hash value, the segment hash management table, and the hash function table.

The first hash value is a hash value outputted by inputting the segments to the first hash function correlated with the cell areas by the hash function table. In the same manner, the second hash value is a hash value outputted by inputting the segments to the second hash function correlated with the cell areas by the hash function table.

The information of referenced times is the information denoting the number of times the segments (data) have been referenced. Further, the address is the information denoting the storage position at which the segments are stored.

In the same manner, the segment management table D83 correlated with the second cell area includes a plurality of pieces of information composed of the second hash value, the third hash value, information of referenced times, and address. The third hash value is a hash value outputted by inputting the segments to the third hash function correlated with the cell areas by the hash function table. In the same manner, the segment management table D83 correlated with the third cell area includes a plurality of pieces of information composed of the third hash value, the first hash value, information of referenced times, and address.

The file system control portion 11 accepts a file write request or a file read request from a computer program (an application program or the like, for example) executed by the information processing apparatus 100. A file write request includes the data composing a file and the path of the file. A file read request includes a file name in the file system (a file name including the path).

On accepting a file write request, the file system control portion 11 generates the segments by dividing the data composing the file included in the accepted file write request. The file system control portion 11 outputs the write request including the generated segments to the write request acceptance portion 12.

Further, on accepting a file read request, the file system control portion 11 acquires the hash values (the first hash value to the third hash value in this exemplary embodiment) correlated with the segments composing the file specified by the file name based on the file name included in the accepted file read request, and the tables shown in FIGS. 4 to 7. Then, the file system control portion 11 outputs the read request including the acquired hash values to the read request acceptance portion 18.

The write request acceptance portion 12 accepts the write request outputted by the file system control portion 11. When the write request acceptance portion 12 has accepted the write request, the hash value acquisition processing portion 13 references the hash function table to carry out a process for acquiring the hash values by inputting the data included in the write request to each of the hash functions set to be utilized for some of the cell areas.

As shown in FIG. 9, for example, the hash function HA ("hash A") and the hash function HB ("hash 13") are utilized for the first cell area ("cell 1"); the hash function HB ("hash B") and the hash function HC ("hash C") are utilized for the second cell area ("cell 2"); and the hash function HC ("hash C") and the hash function HA ("hash A") are utilized for the third cell area ("cell 3").

Therefore, the hash value acquisition processing portion 13 carries out the process for acquiring the first hash value by inputting the data included in the write request to the hash function HA (the first hash function), acquiring the second hash value by inputting the data to the hash function HB (the second hash function), and acquiring the third hash value by inputting the data to the hash function HC (the third hash function).

That is, the hash value acquisition processing portion 13 carries out the process for acquiring the three hash values by inputting the data included in the write request to each of the three hash functions HA to HC different from each other.

When the write request acceptance portion 12 has accepted the write request, the storage processing portion 14 stores the data included in the accepted write request into each of the plurality of cell areas set by the cell area information D33.

At the time, the storage processing portion 14 determines whether or not the first cell area has stored a first hash value identical to the first hash value acquired by the hash value acquisition processing portion 13 and a second hash value identical to the second hash value acquired by the hash value acquisition processing portion 13 in correlation with each other.

If the storage processing portion 14 has determined that they are not stored in the first cell area, it correlates the segments included in the write request, the first hash value acquired by the hash value acquisition processing portion 13, the second hash value acquired by the hash value acquisition processing portion 13, and the information of referenced times denoting a predetermined initial value ("1" in this exemplary embodiment) as the number of times the segments have been referenced, and then newly stores the correlated items into the first cell area.

On the other hand, if the storage processing portion 14 has determined that they are stored in the first cell area, it changes the stored information of referenced times correlated with the first hash value and the second hash value such as to add one to the number of times denoted by the information of referenced times.

In the same manner, the storage processing portion 14 determines whether or not the second cell area has stored a second hash value identical to the second hash value acquired by the hash value acquisition processing portion 13 and a third hash value identical to the third hash value acquired by the hash value acquisition processing portion 13 in correlation with each other.

Then, if the storage processing portion 14 has determined that they are not stored in the second cell area, it correlates the segments, the second hash value, the third hash value, and the information of referenced times denoting the initial value, and then newly stores the correlated items into the second cell area. On the other hand, if the storage processing portion 14 has determined that they are stored in the second cell area, it changes the stored information of referenced times correlated with the second hash value and the third hash value such as to add one to the number of times denoted by the information of referenced times.

In the same manner, the storage processing portion 14 determines whether or not the third cell area has stored a third hash value identical to the third hash value acquired by the hash value acquisition processing portion 13 and a first hash value identical to the first hash value acquired by the hash value acquisition processing portion 13 in correlation with each other.

Then, if the storage processing portion 14 has determined that they are not stored in the third cell area, it correlates the segments, the third hash value, the first hash value, and the information of referenced times denoting the initial value, and then newly stores the correlated items into the third cell area. On the other hand, if the storage processing portion 14 has determined that they are stored in the third cell area, it changes the stored information of referenced times correlated with the third hash value and the first hash value such as to add one to the number of times denoted by the information of referenced times.

Further, when the storage processing portion 14 determines whether or not a hash value identical to the acquired hash value is stored, it carries out the determination by taking out the stored hash values in one-by-one order to compare each taken-out hash value with the acquired hash value. Further, when the storage processing portion 14 determines whether or not a hash value identical to the acquired hash value is stored, it may also utilize methods such as the binary search method and the like.

When the cell area has stored a hash value identical to one hash value and another hash value different from the other hash value in correlation with each other based on the hash functions utilized for the cell area among the hash values acquired by the hash value acquisition processing portion 13 with respect to each cell area, the hash function change processing portion 15 carries out thereafter a process for changing the hash function utilized by the hash value acquisition processing portion 13 for acquiring, the other hash value to another hash function.

That is, for example, when the first cell area has stored a first hash value identical to the first hash value acquired by the hash value acquisition processing portion 13 and a second hash value different from the second hash value acquired by the hash value acquisition processing portion 13 in correlation with each other, the hash function change processing portion 15 carries out thereafter the process for changing the hash function utilized by the hash value acquisition processing portion 13 for acquiring the first hash value from the first hash function to a fourth hash function different from the first hash function.

Further, in a modification of the exemplary embodiment, the hash function change processing portion 15 may also be configured to select a hash function as the fourth hash function which has a wider data range than the first hash function to be able to cause the inputted data and the outputted hash value to correspond to n to 1 (n is an integer including 1). By virtue of this, it is possible to further reduce the probability of collision occurring thereafter in the hash value by changing the hash function.

In particular, the hash function change processing portion 15 sets a predetermined value denoting true to the nonuse flag correlated with the hash function HA set as the first hash function by the hash function table.

When the cell area has stored a hash value identical to one hash value and another hash value different from the other hash value in correlation with each other based on the hash functions utilized for the cell area among the hash values acquired by the hash value acquisition processing portion 13 with respect to each cell area, the cell area extinguishment processing portion 16 carries out a process for deleting the cell area from the cell areas into which the storage processing portion 14 stores the segments.

Therefore, for example, when the first cell area has stored a first hash value identical to the first hash value acquired by the hash value acquisition processing portion 13 and a second hash value different from the second hash value acquired by the hash value acquisition processing portion 13 in correlation with each other, the cell area extinguishment processing portion 16 carries out the process for deleting the first cell area from the cell areas into which the storage processing portion 14 stores the segments.

Further, when the number of the cell areas in the external storage device 110 is less than a preset number (three in this exemplary embodiment), the cell area generation processing portion 17 carries out a process for increasing the number of the cell areas into which the storage processing portion 14 stores the segments if the newly storable data amount is more than a predetermined threshold amount in the external storage device 110.

When the cell area generation processing portion 17 has newly added a cell area, the hash function change processing portion 15 sets a hash function (a fourth hash function, for example) correlated with the nonuse flag without a set value in the hash function table as the hash function utilized for that cell area.

The read request acceptance portion 18 accepts the read request outputted by the file system control portion 11. The read request acceptance portion 18 reads out the segments stored in each cell area based on the hash values included in the accepted read request, and the segment management table shown in FIG. 10. Then, the read request acceptance portion 18 outputs the read-out segments to the file system control portion 11.

The file system control portion 11 generates a file from the segments outputted by the read request acceptance portion 18, and outputs the generated file to the computer program which has outputted the file read request.

Next, explanations will be made specifically with respect to operations of the information processing system 1 described hereinabove. First, referring to FIG. 11, an explanation will be made with respect to the operation of the information processing system 1 for managing the file system.

Cell areas are formed in the storage area of the external storage device 110. The information processing system 1 increases (generates) cell areas if the number of cell areas is not sufficient; on the other hand, it decreases (extinguishes)

cell areas if collision occurs in hash value. That is, when the newly storable data amount is more than a predetermined threshold amount in the external storage device 110, and when there are spare hash functions without a value set in the nonuse flag, the storage area of the external storage device 110 utilizes cell areas to autonomously manage itself.

First, the information processing apparatus 100 accepts a file system generation request based on the instruction from a user (the step 1105). The file system generation request includes information denoting the maximum number of active (utilizing) cell areas, and information denoting the number of hash functions utilized for one cell area. In this exemplary embodiment, it is assumed that the maximum number of utilizing cell areas is three, and the number of hash functions utilized for one cell area is two.

Next, the information processing apparatus 100 carries out initialization for the file system (the step 1110). In particular, the information processing system 1 deletes the data stored in the external storage device 110, and sets a preset initial value to the file system information D30 stored in the internal storage device.

Figure 12:
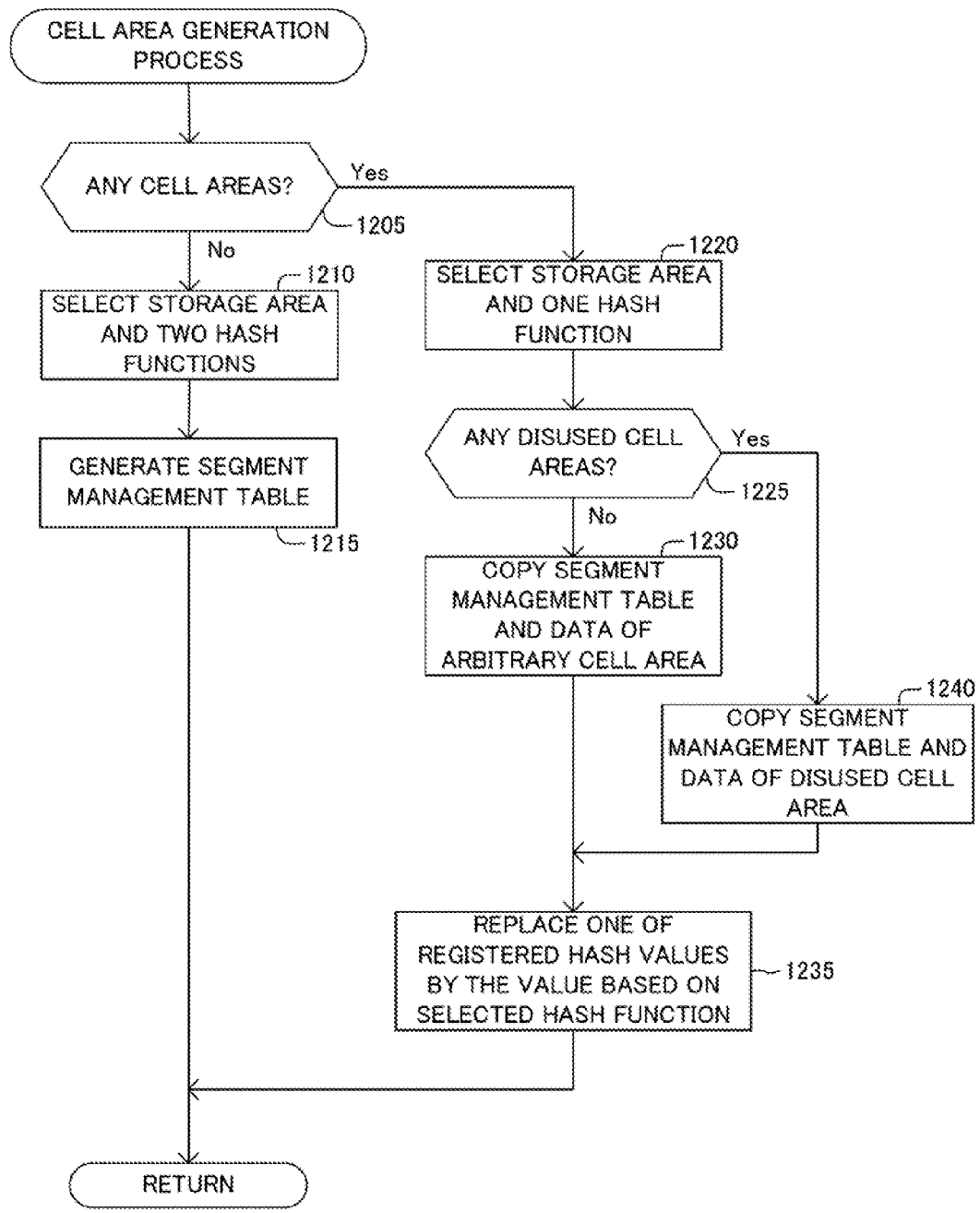
FIG. 12 is a flowchart showing a computer program to be executed by the information processing apparatus shown in FIG. 1 for generating a cell area.

Then, in order to carry out a process to set up (generate) one cell area in the step 1115, the information processing apparatus 100 proceeds to the step 1205 in FIG. 12. Next, the information processing apparatus 100 determines whether or not there are any cell areas having already been set up.

In the state here, since no cell area has been set up, the information processing apparatus 100 determines it as "No", and proceeds to the step 1210. Then, the information processing apparatus 100 selects two hash functions (here, the hash function HA and hash function HB) correlated with the nonuse flag without a set value while referencing the hash function table shown in FIG. 9. Further, the information processing apparatus 100 specifies a storage area to be assigned as a cell area (the step 1210).

Further, the information processing apparatus 100 creates (stores) the segment management table in the first area of the specified storage area (the step 1215).

Next, the information processing apparatus 100 proceeds to the step 1120 to determine whether or not the number of the set-up cell areas is less than or equal to the maximum number (three in this exemplary embodiment). In the state here, the information processing apparatus 100 determines it as "Yes", and proceeds to the step 1125 to determine whether or not there is a sufficient resource for generating the cell areas.

If the newly storable data amount is more than a predetermined threshold amount in the external storage device 110, and there are presently unutilized hash functions without a value set in the nonuse flag (hash functions correlated with the nonuse flag without a set value), then the information processing apparatus 100 determines that the resource is sufficient.

When the information processing apparatus 100 determines it as "Yes" in the step 1125, it proceeds to the step 1130 and, in the same manner as in the step 1115, in order to generate one cell area, the information processing apparatus 100 proceeds to the step 1205 in FIG. 12.

Next, the information processing apparatus 100 determines whether or not there are cell areas having already been set up. In the state here, since one cell area has been set up, the information processing apparatus 100 determines it as "Yes", and proceeds to the step 1220.

The information processing apparatus 100 selects one hash function (here, the hash function HC) correlated with the nonuse flag without a set value while referencing the hash function table shown in FIG. 9. Further, the information processing apparatus 100 specifies a storage area to be assigned as a cell area.

Next, the information processing apparatus 100 determines whether or not there are any disused cell areas (the step 1225). The disused cell areas are, as will be described hereinafter, cell areas extinguished due to collision occurring in hash value.

In the state here, because there are no disused cell areas, the information processing apparatus 100 determines it as "No", and proceeds to the step 1230 to select an arbitrary cell area from the cell areas having already been set up to carry out the process to generate a new cell area based on the selected cell area.

Figure 13:
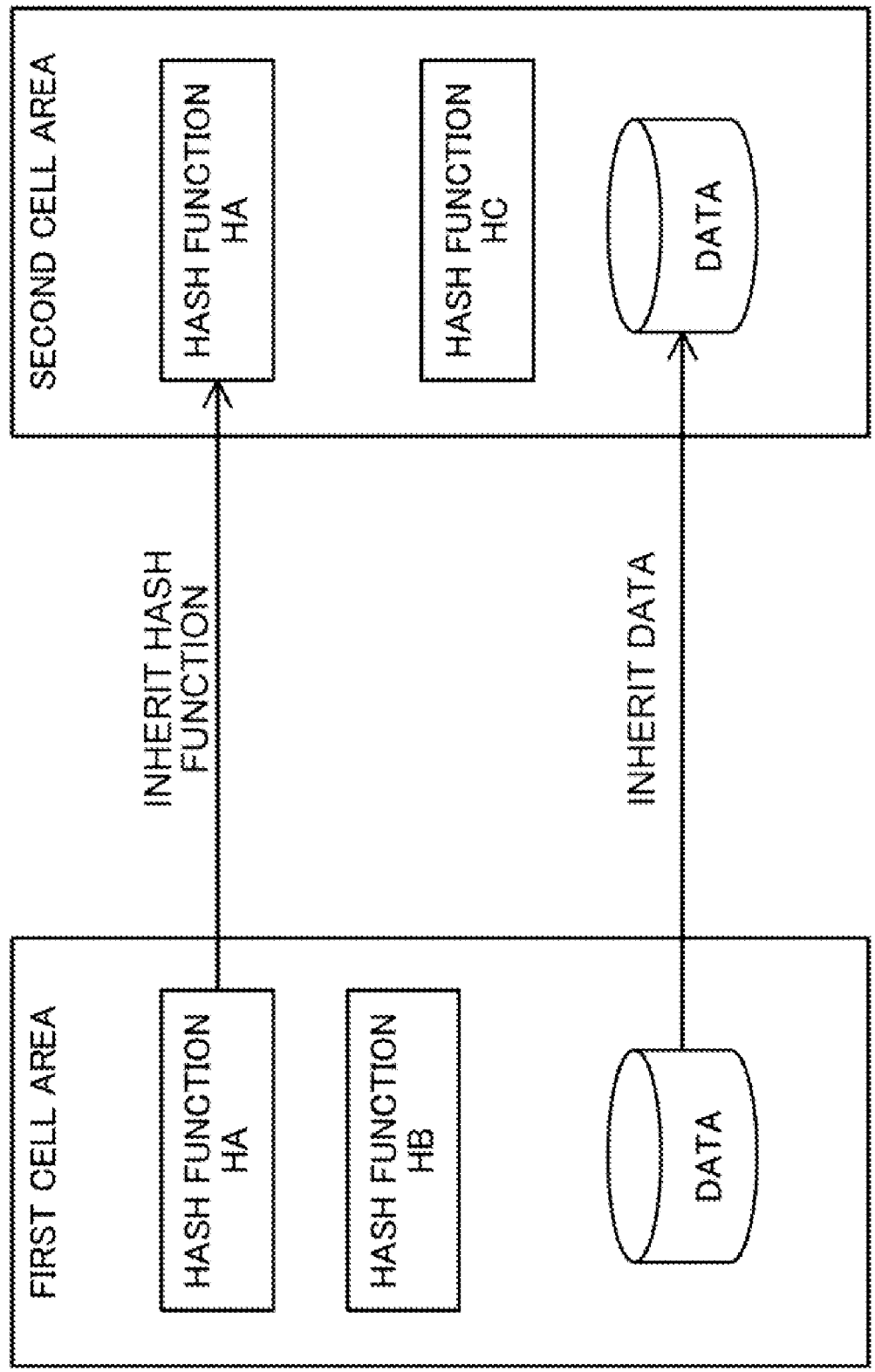
FIG. 13 is an explanatory diagram conceptually showing information inherited between the cell areas at the time of generating a second cell area based on a first cell area.
Figure 14:
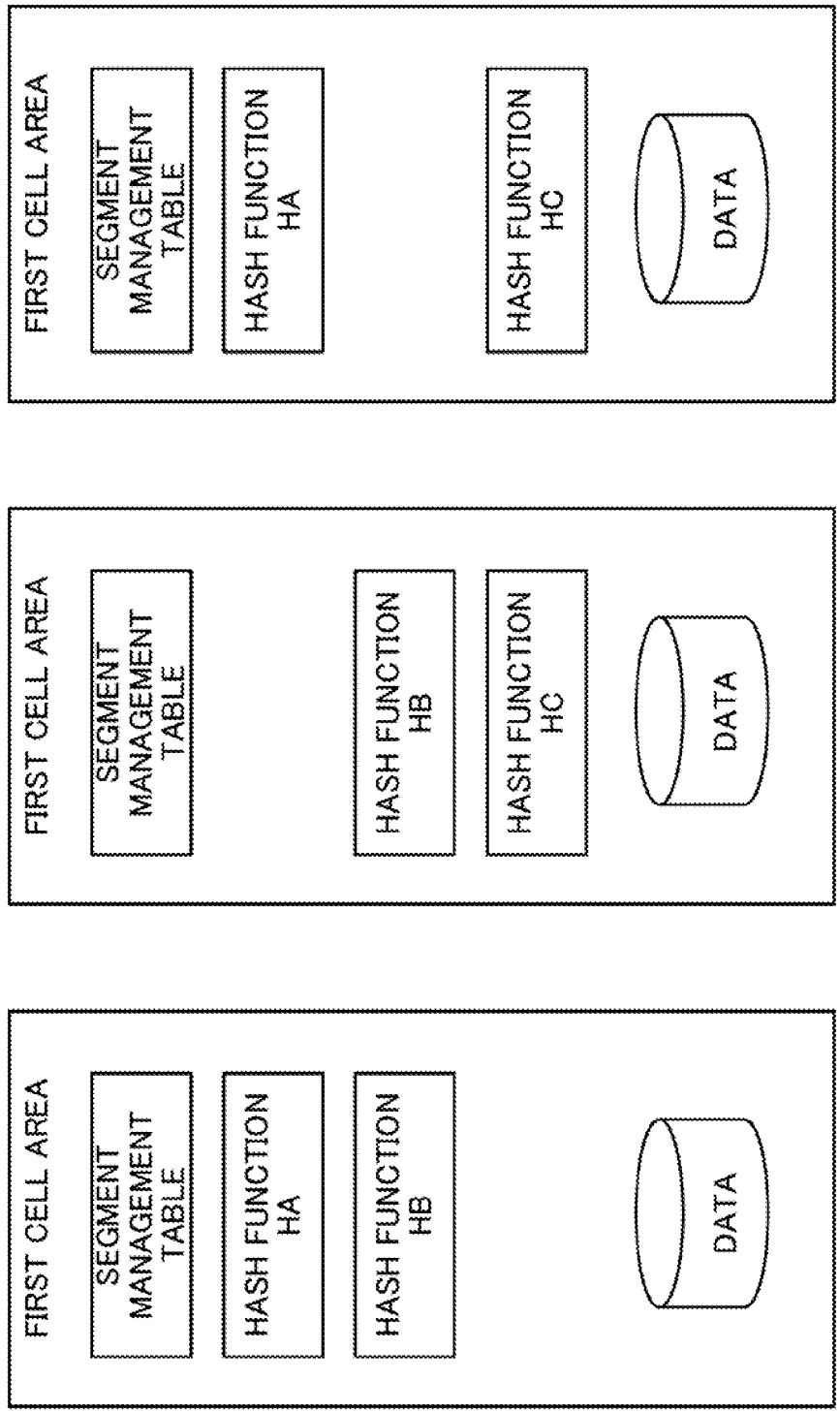
FIG. 14 is an explanatory diagram conceptually showing a generated cell area.

In particular, as conceptually shown in FIG. 13, the information processing apparatus 100 stores the data (segments) and the segment management table stored in the cell area having already been set up (here, the first cell area) into the newly generated cell area (the second cell area).

Further, the information processing apparatus 100 changes the information of the hash function table shown in FIG. 9 to cause the second cell area to inherit one of the hash functions utilized for the first cell area (here, the hash function HB). In addition, the information processing apparatus 100 changes the information of the hash function table shown in FIG. 9 to set the hash function selected in the step 1220 (the hash function HC) as a hush function utilized for the second cell area.

Next, in the step 1235, the information processing apparatus 100 replaces the corresponding hash value in the segment management table stored in the second cell area (the third hash value) by the hash value outputted by inputting every segment stored in the second cell area to the hash function (the hash function HC) selected in the step 1220.

Then, the information processing apparatus 100 proceeds to the step 1135 to determine whether or not collision has occurred in the hash value. The details of collision in a hash value will be described hereinafter. In the state here, because collision has not occurred in the hash value, the information processing apparatus 100 determines it as "No", and returns to the step 1120.

Then, the information processing apparatus 100 repeatedly carries out the process of the steps 1120 to 1135 to generate the third cell area in the same manner as to generate the second cell area. By virtue of this, as conceptually shown in FIG. 14, the first cell area to the third cell area are formed in the external storage device 110.

Further, when having taken out an arbitrary pair of cell areas from the plurality of cell areas, the information processing apparatus 100 respectively assigns hash functions to the cell areas such that one part of the hush functions utilized for one cell area of the taken-out cell areas is identical to one part of the hash functions utilized for the other cell area, and the other part of the hush functions utilized for the one cell area is different from the other part of the hash functions utilized for the other cell area.

In other words, at the time of storing the data included in the write request into the storage device, the information processing apparatus 100 correlates the data with at least two hash values of the acquired hash values and then stores the correlated items into each of the plurality of cell areas. At the time, the information processing apparatus 100 stores the data and the hash values into each cell area such that the one hash value, which is correlated with the data and stored in the first cell area which is an arbitrary one of the plurality of cell areas, is correlated with the data and stored in the second cell area other than the first area; and the other one hash value, which is correlated with the data and stored in the first cell area, is correlated with the data and stored in the third cell area other than the first area and the second cell area.

Therefore, in this exemplary embodiment, the hash function HA and the hash function HB are set as the hash functions utilized for the first cell area; the hash function HB and the hash function HC are set as the hash functions utilized for the second cell area; and hash function HC and the hash function HA are set as the hash functions utilized for the third cell area. That is, the information is set to the hash function table as shown in FIG. 9.

Next, explanations will be made with respect to the case that collision occurs in a hash value. In such cases, when the information processing apparatus 100 has proceeded to the step 1135, it determines it as "Yes", and proceeds to the step 1140 to extinguish the cell area utilizing the hash function as the base for acquiring the hash value related to the occurred collision.

In particular, the information processing apparatus 100 sets information indicating the effect to extinguish the cell area to the information for specifying the cell area in the cell area information D33. By virtue of this, the information processing apparatus 100 deals with that cell area as an extinguished cell area thereafter.

Further, the information processing apparatus 100 sets a value denoting true to the nonuse flag correlated with the hash function as the base for acquiring, the hash value related to the occurred collision in the hash function table shown in FIG. 9. By virtue of this, the information processing apparatus 100 will no longer utilize this hash function thereafter.

Next, explanations will be made with respect to the case that the information processing apparatus 100 carries out generation of a cell area when there are disused cell areas. In such cases, when the information processing apparatus 100 has proceeded to the step 1225, it determines it as "Yes", and proceeds to the step 1240 to select an arbitrary cell area from the disused cell areas to carry out the process to generate a new cell area based on the selected cell area.

In particular, the information processing apparatus 100 stores the data (segments) and the segment management table stored in the extinguished cell area into the newly generated cell area.

Further, the information processing apparatus 100 changes the information of the hash function table shown in FIG. 9 to cause the newly generated cell area to inherit one of the hash functions utilized for the extinguished cell area. In addition, the information processing apparatus 100 changes the information of the hash function table shown in FIG. 9 to set the hash function selected in the step 1220 as a hush function utilized for the newly generated cell area.

Next, in the step 1235, the information processing apparatus 100 replaces the corresponding hash value in the segment management table stored in the newly generated cell area by the hash value outputted by inputting every segment stored in the newly generated cell area to the hash function selected in the step 1220. By virtue of this, it is possible to reduce the processing load on the information processing apparatus 100 for generating cell areas. Further, the information processing apparatus 100 is preferably configured to carry out a data synchronization with the normal cells in action after the replacement of hash values.

Further, when calculating hash values based on the identical hash function for each of the plurality of cell areas, the information processing apparatus 100 may also be configured to set the hash value calculated for one cell area to the other cell areas.

Figure 15:
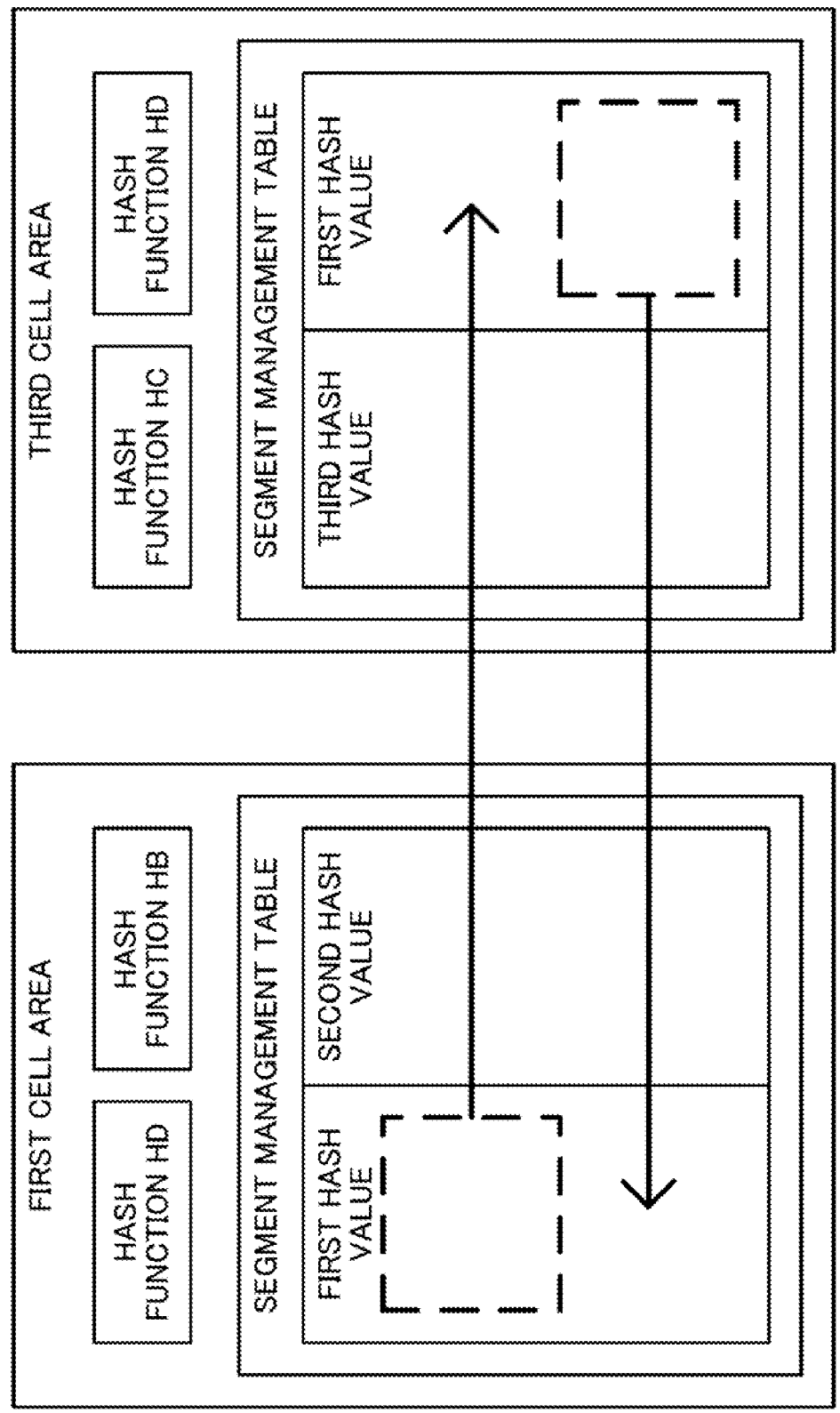
FIG. 15 is an explanatory diagram conceptually showing an operation of the information processing apparatus in the event of calculating a first hash value based on a hash function HD for the first cell area and for a third cell area, respectively.

For example, as shown in FIG. 15, it is assumed that the hash function HD is utilized to acquire the first hash value for the first cell area and, meanwhile, the hash function HD is also utilized to acquire the first hash value for the third cell area.

In this case, the information processing apparatus 100 acquires the first hash value for the first half of the segments stored in the first cell area, and sets the acquired first hash value to the first cell area. Then, the information processing apparatus 100 sets the acquired first hash value to the third cell area, too.

On the other hand, the information processing apparatus 100 acquires the first hash value for the last half of the segments stored in the third cell area, and sets the acquired first hash value to the third cell area. Then, the information processing apparatus 100 sets the acquired first hash value to the first cell area, too.

By virtue of this, it is possible to reduce the processing load on the information processing apparatus 100 for acquiring hash values in comparison with the case that the information processing apparatus 100 is configured to acquire the first hash value for all the segments stored in the first cell area, and acquire the first hash value for all the segments stored in the third cell area.

Figure 16:
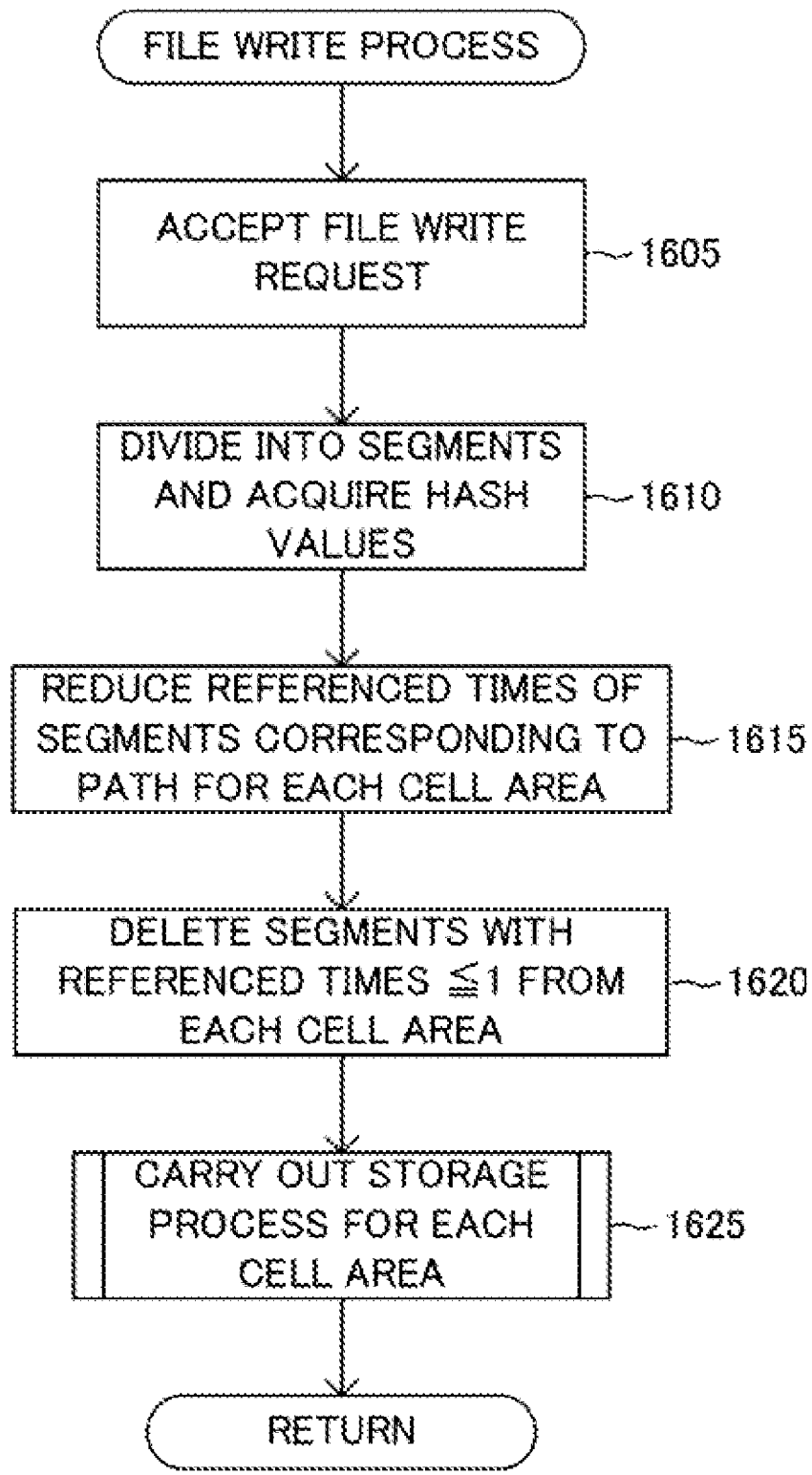
FIG. 16 is a flowchart showing a computer program to be executed by the information processing apparatus shown in FIG. 1 for writing a file according to a file write request.
Figure 18:
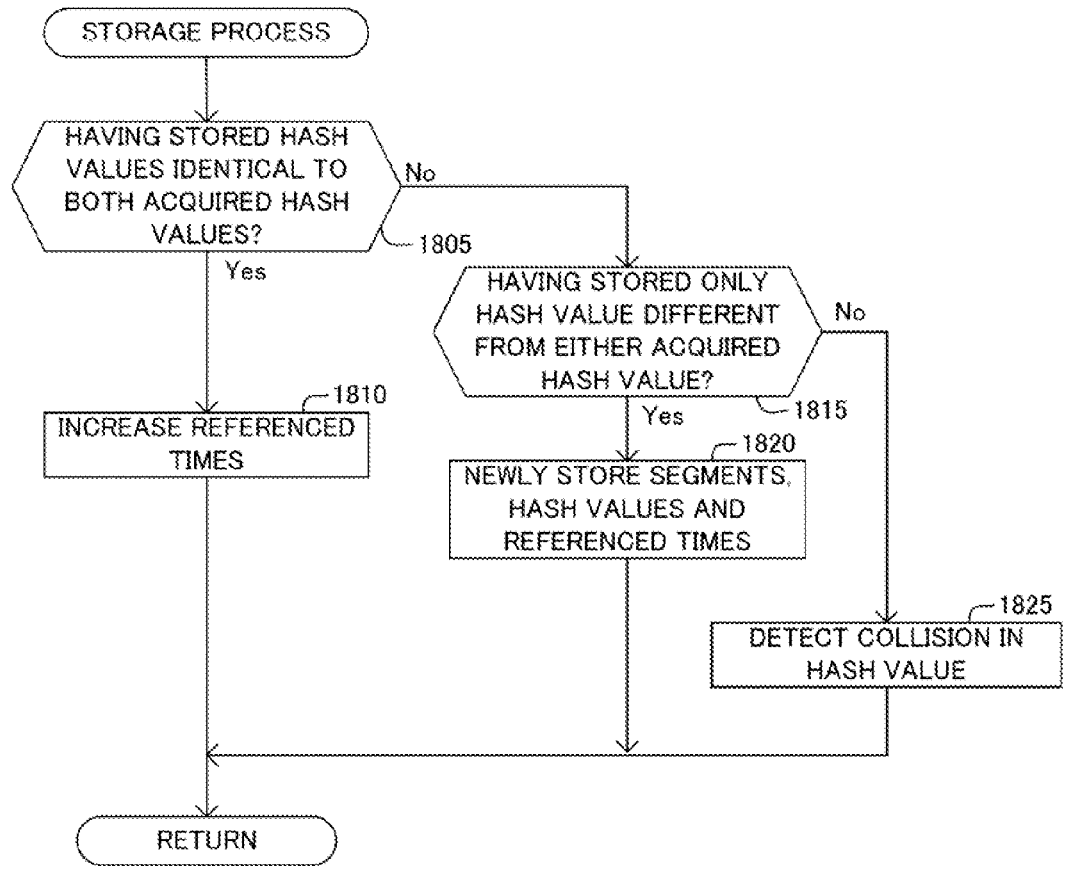
FIG. 18 is a flowchart showing a computer program to be executed by the information processing apparatus shown in FIG. 1 for storing segments into a storage device.

Next, referring to FIG. 16, explanations will be made with respect to the operation of the information processing system 1 for storing the data composing a file into the external storage device 110.

First, the information processing apparatus 100 accepts a file write request (the step 1605: a write request acceptance process). Then, the information processing apparatus 100 generates the segments by dividing the data composing the file included in the file write request. Next, the information processing apparatus 100 references the hash function table shown in FIG. 9 to carry out a process for acquiring the hash value by inputting the generated segments to each of the hash functions set to be utilized for one of the cell areas (the step 1610: a hash value acquisition processing process).

In this exemplary embodiment as shown in FIG. 17, the information processing apparatus 100 divides a file into six segments S1 to S6, and utilizes three hash functions, i.e., the hash function HA, the hash function HB, and the hash function HC, to acquire the respective hash values HA1 to HC6 (the first hash value to the third hash value).

Next, based on the path included in the file write request, the file meta-information table, and the node relationship table, the information processing apparatus 100 acquires the node number and the first segment number corresponding to the path. Further, based on the acquired node number and first segment number, and the file composition segment table, the information processing apparatus 100 acquires all the segment numbers composing the file. Then, based on the acquired segment numbers, and the segment hash management table, the information processing apparatus 100 acquires the hash values for the segments specified by the segment numbers (the segments having already been stored in the external storage device 110).

Then, the information processing apparatus 100 changes the information of referenced times correlated with two hash values identical to the two hash values based on the hash functions utilized for the cell area among the acquired hash values in the segment management table shown in FIG. 10 for each cell area so as to subtract one from the number of referenced times denoted by the information of referenced times (the step 1615).

Next, the information processing apparatus 100 deletes the segments correlated with the information of referenced times denoting the number of referenced times less than two from each cell area in the segment management table shown in FIG. 10 (the step 1620).

Then, the information processing apparatus 100 carries out storage processing independently for each cell area (the step 1625: a storage processing process). Here, although explanations will be made with respect to the storage processing for the first cell area, it is carried out in the same manner for the other cell areas.

In order to carry out the storage processing for the first cell area, the information processing apparatus 100 proceeds to the step 1805. The information processing apparatus 100 determines whether or not the two hash values are correlated and stored, that is, the two hash values identical to the hash values based on the two hash functions set for the cell area among the hash values acquired in the step 1610 (i.e., the first hash value and the second hash value).

That is, the information processing apparatus 100 determines whether or not the first cell area has correlated and stored a first hash value identical to the first hash value of the hash values acquired in the step 1610, and a second hash value identical to the second hash value of the hash values acquired in the step 1610.

Now, the explanation will be continued on the assumption that the first cell area has correlated and stored a first hash value identical to the first hash value acquired in the step 1610, and a second hash value identical to the second hash value acquired in the step 1610.

In this case, the information processing apparatus 100 determines it as "Yes", and proceeds to the step 1810 to change the information of referenced times correlated with the two hash values in the segment management table shown in FIG. 10 so as to add one to the number of times denoted by the information of referenced times.

Further, the explanation will be continued on the assumption that the first cell area has stored only a first hash value different from the first hash value acquired in the step 1610, and the first cell area has stored only a second hash value different from the second hash value acquired in the step 1610.

In this case, the information processing apparatus 100 determines it as "Yes" in the step 1805, and proceeds to the step 1815. Then, the information processing apparatus 100 determines whether or not the first cell area has stored only a first hash value different from the first hash value acquired in the step 1610, and the first cell area has stored only a second hash value different from the second hash value acquired in the step 1610.

According to the above assumption, the information processing apparatus 100 determines it as "Yes", and proceeds to the step 1820 to cause the first cell area to newly correlate and store the segments generated in the step 1610, the first hash value acquired in the step 1610, the second hash value acquired in the step 1610, and the information of referenced times denoting the initial value. In particular, the information processing apparatus 100 adds information to the segment management table shown in FIG. 10, that is, the information composed of the address denoting the position at which the segments are stored, the two hash values, and the information of referenced times.

Further, the explanation will be continued on the assumption that the first cell area has correlated and stored a first hash value identical to the first hash value acquired in the step 1610, and a second hash value different from the second hash value acquired in the step 1610.

In this case, the information processing apparatus 100 determines it as "No" in the step 1815, and proceeds to the step 1825 to detect that collision has occurred in the first hash value. By virtue of this, when the information processing apparatus 100 has proceeded to the step 1135 in FIG. 11, it determines it as "Yes", and proceeds to the step 1140 to extinguish the first cell area and, meanwhile, to set the value denoting true to the nonuse flag correlated with the hash function HA.

Figure 19:
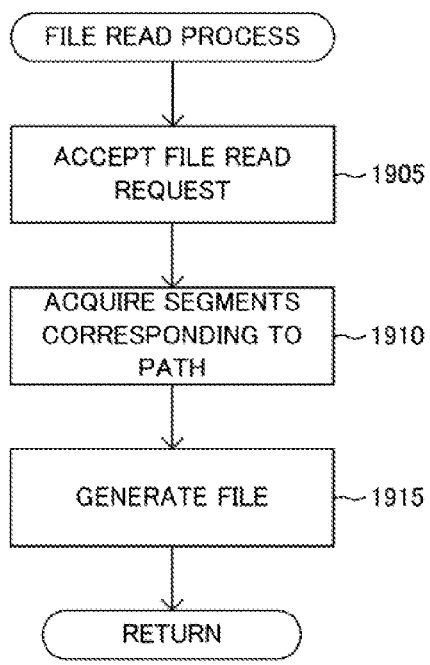
FIG. 19 is a flowchart showing a computer program to be executed by the information processing apparatus shown in FIG. 1 for reading a file according to a file read request.

Next, referring to FIG. 19, explanations will be made with respect to the operation of the information processing system 1 for reading out a file composed of the segments stored in the external storage device 110.

First, the information processing apparatus 100 accepts a file read request (the step 1905). Then, based on the path included in the file read request, the file meta-information table, and the node relationship table, the information processing apparatus 100 acquires the node number and the first segment number corresponding to the path.

Further, based on the acquired node number and first segment number, and the file composition segment table, the information processing apparatus 100 acquires all the segment numbers composing the file. Then, based on the acquired segment numbers, and the segment hash management table, the information processing apparatus 100 acquires the hash values for the segments specified by the segment numbers (the segments having already been stored in the external storage device 110).

Then, the information processing apparatus 100 acquires the segments stored with the address correlated with the hash values identical to the two acquired the hash values by the segment management table shown in FIG. 10 (the step 1910).

Next, the information processing apparatus 100 generates a file based on the acquired segments and the file composition segment table, and outputs the generated file to the computer program having outputted the file read request (the step 1915).

As explained hereinabove, according to the first exemplary embodiment of the information system in accordance with the present invention, even if collision has occurred in either one of the first hash value and the second hash value, it is possible to detect whether or not the data (segments) are identical by comparing one with the other. That is, when collision has occurred in a hash value, it is possible to detect whether or not the data are identical while preventing the processing load from becoming too heavy. By virtue of this, it is possible to not only avoid mistakenly recognizing two different data as an identical data but also avoid repeatedly storing an identical data into the external storage device 110 (storage device). As a result, it is possible to reduce the data amount stored in the storage device.

Further, in the above first exemplary embodiment, when the storage device (the first cell area) has stored a first hash value identical to the acquired first hash value and a second hash value different from the acquired second hash value in correlation with each other, the information processing apparatus 100 carries out thereafter the process for changing the hash function utilized for acquiring the first hash value from the first hash function (the hash function HA) to the fourth hash function (the hash function HD) different from the first hash function.

By virtue of this, when having accepted a write request including a data, it is possible to avoid a continuous state of collision occurring in either one of the first hash value and the second hash value. Therefore, it is possible to detect whether or not an identical data to that data is stored only by comparing either one of the first hash value and the second hash value. That is, it is possible to reduce the processing amount of the information processing apparatus 100.

Further, when collision has occurred in a hash value, even if the information processing apparatus is configured to store the data originating the occurrence of collision in the hash value into a free space according to a predetermined rule, and read out the data according to that rule at the time of reading out the data, it is still possible to prevent the time required for reading out the data from becoming too long.

Further, in the above first exemplary embodiment, when storing the data included in a write request into the external storage device 110 (storage device), the information processing apparatus 100 stores the data into each of the plurality of cell areas in the external storage device 110.

By virtue of this, even if the data stored in one cell area has disappeared, it is still possible to acquire the data stored in the other cell areas. That is, it is possible to secure redundancy of the data stored in the external storage device 110.

Further, according to the above first exemplary embodiment, even if collision has occurred in one hash value, it is possible to secure two or more hash values which are hash values commonly stored in a plurality of cell areas and in which collision has not occurred. As a result, when collision has occurred in a hash value, for example, if the information processing apparatus is configured to update that hash value to another hash value based on another hash function, even at the time of accepting the write request in updating a hash value, it is still possible to achieve the effect described hereinabove.

Further, in the above first exemplary embodiment, when the number of cell areas is less than a preset number in the external storage device 110 (storage device), if the newly storable data amount is more than a threshold amount in the external storage device 110, the information processing apparatus 100 carries out the process to increase the number of cell areas for storing data.

By virtue of this, when the newly storable data amount is more than a threshold amount in the external storage device 110, it is possible to increase the number of cell areas up to a preset number.

Further, in the above first exemplary embodiment, the data included in a write request is segments as data blocks of dividing the data composing the file according to each predetermined data size. By virtue of this, when only a part of the file overlaps, it is possible to prevent the overlapped part from being repeatedly stored in the external storage device 110 (storage device). As a result, it is possible to further reduce the data amount stored in the external storage device 110.

A Second Exemplary Embodiment

Figure 20:
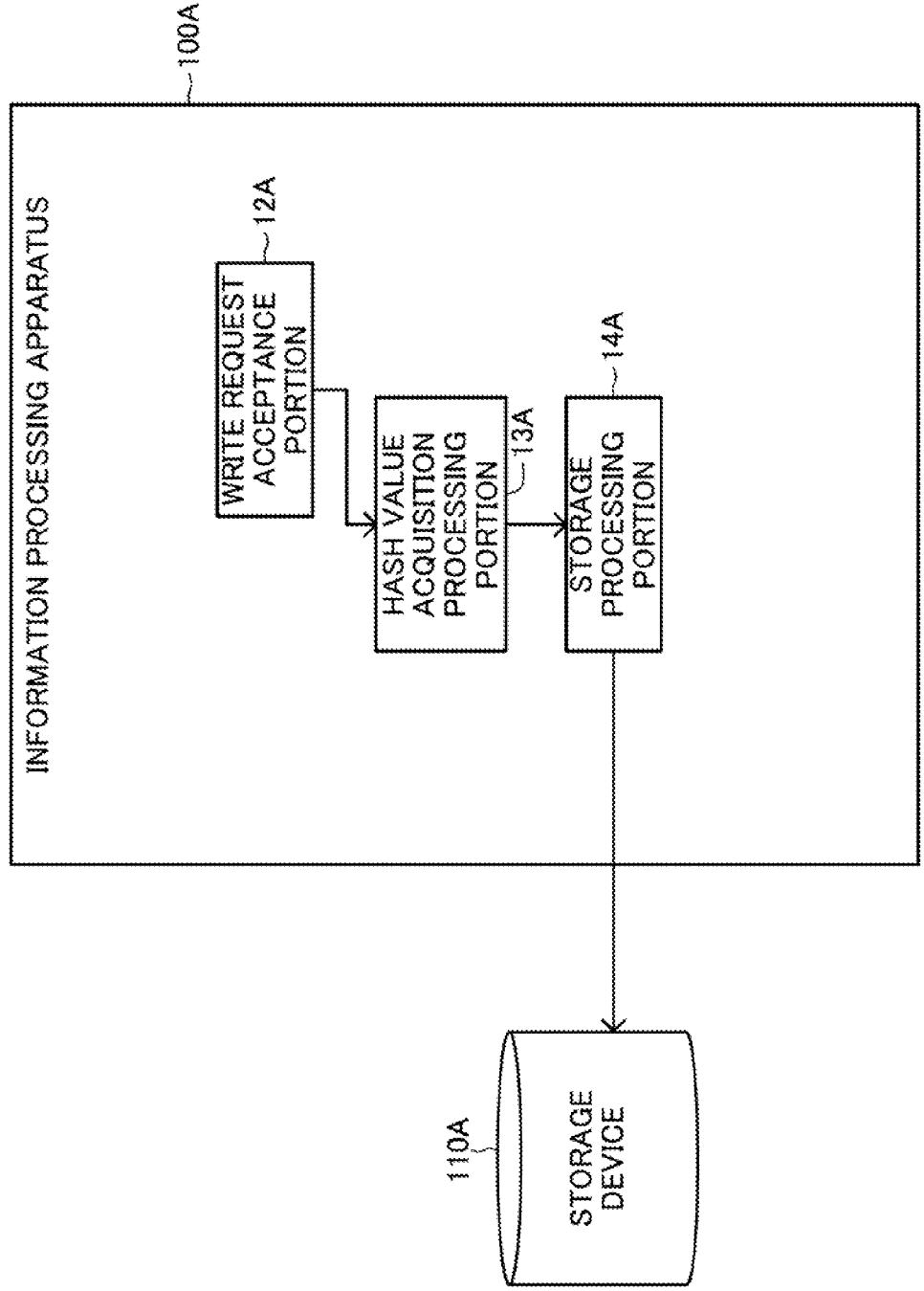
FIG. 20 is a block diagram showing an outline of a function of an information processing system in accordance with a second exemplary embodiment of the present invention.

Next, referring to FIG. 20, explanations will be made with respect to an information processing apparatus in accordance with a second exemplary embodiment of the present invention. An information processing apparatus 100A in accordance with the second exemplary embodiment includes a write request acceptance portion 12A, a hash value acquisition processing portion 13A, and a storage processing portion 14A.

The write request acceptance portion 12A accepts a write request including a data. When the write request acceptance portion 12A has accepted the write request, the hash value acquisition processing portion 13A carries out a process for acquiring a first hash value by inputting the data included in the write request to a first hash function, and acquiring a second hash value by inputting the data to a second hash function.

When the storage device 110A has not stored a first hash value identical to the first hash value acquired by the hash value acquisition processing portion 13A and a second hash value identical to the second hash value acquired by the hash value acquisition processing portion 13A in correlation with each other, the storage processing portion 14A correlates the data included in the write request, the acquired first hash value, the acquired second hash value, and information of referenced times denoting a predetermined initial value as the number of times the data has been referenced, and then newly stores the correlated items into the storage device 110A.

On the other hand, when the storage device 110A has stored a first hash value identical to the first hash value acquired by the hash value acquisition processing portion 13A and a second hash value identical to the second hash value acquired by the hash value acquisition processing portion 13A in correlation with each other, the storage processing portion 14A changes the stored information of referenced times correlated with the first hash value and the second hash value such as to add one to the number of times denoted by the information of referenced times.

According to the second exemplary embodiment, in the same manner as the first exemplary embodiment described earlier, even if collision has occurred in either one of the first hash value and the second hash value, it is possible to detect whether or not the data are identical by comparing one with the other. That is, when collision has occurred in a hash value, it is possible to detect whether or not the data are identical while preventing the processing load from becoming too heavy. By virtue of this, it is possible to not only avoid mistakenly recognizing two different data as an identical data but also avoid repeatedly storing an identical data into the storage device. As a result, it is possible to reduce the data amount stored in the storage device.

In this case, the information processing apparatus preferably includes a hash function change processing means for carrying out a process to change the hash function utilized for the hash value acquisition means to acquire the first hash value thereafter from the first hash function to a fourth hash function different from the first hash function when the storage device has stored a first hash value identical to the acquired first hash value and a second hash value different from the acquired second hash value in correlation with each other. That is, by virtue of the hash function change processing means, it is possible to replace the hash function with collision occurring in the hash value by another hash function.

By virtue of this, it is possible to avoid a continuous state of collision occurring in either one of the first hash value and the second hash value. Therefore, it is possible to detect whether or not an identical data to that data is stored only by comparing either one of the first hash value and the second hash value. That is, it is possible to reduce the processing amount of the information processing apparatus.

Further, when collision has occurred in a hash value, even if the information processing apparatus is configured to store the data originating the occurrence of collision in the hash value into a free space according to a predetermined rule, and read out the data according to that rule at the time of reading out the data, it is still possible to prevent the time required for reading out the data from becoming too long.

In this case, it is preferable that the first hash function be configured to output a hash value outputted from a first basic hash function by inputting a data composed of the inputted data and a predetermined first additional data to the first basic hash function which is a hash function as the base; and the second hash function be configured to output a hash value outputted from a second basic hash function by inputting a data composed of the inputted data and a predetermined second additional data different from the first additional data to the second basic hash function which is a hash function as the base.

In this case, it is preferable that the first basic hash function and the second basic hash function be an identical basic hash function. By virtue of this, it is possible to easily prepare a plurality of hash functions by preparing only one basic hash function:

In another aspect of the information processing apparatus, it is preferable that the first basic hash function and the second basic hash function be different basic hash functions. By virtue of this, it is possible to reduce the probability of collision in hash value occurring in both the first hash value and the second hash value for a certain data.

In this case, it is preferable that the storage processing means be configured to store the data included in the write request into each of a plurality of cell areas in the storage device in the event of storing the data into the storage device.

By virtue of this, even if the data stored in one cell area has disappeared, it is still possible to acquire the data stored in the other cell areas. That is, it is possible to secure redundancy of the data stored in the storage device.

In this case, it is preferable that the hash value acquisition means be configured to carry out the process to acquire the hash values by inputting the data included in the write request to each of at least three hash functions different from one another when the write request is accepted; and the storage processing means be configured to store the data in correlation with at least two hash values among the acquired hash values into each of the plurality of cell areas in the event of storing the data included in the write request into the storage device such that one hash value correlated with the data and stored in a first cell area which is an arbitrary one of the plurality of cell areas is correlated with the data and stored in a second cell area other than the first cell area, and the other hash value correlated with the data and stored in the first cell area is correlated with the data and stored in a third cell area other than the first cell area and the second cell area.

By virtue of this, even if collision has occurred in one hash value, it is possible to secure two or more hash values which are hash values commonly stored in a plurality of cell areas and in which collision has not occurred. As a result, when collision has occurred in a hash value, for example, if the information processing apparatus is configured to update that hash value to another hash value based on another hash function, even at the time of accepting the write request in updating a hash value, it is still possible to achieve the effect described hereinabove.

In this case, the information processing apparatus preferably further includes a cell area generation processing means for carrying out a process to increase the number of cell areas for the storage processing means to store the data when the number of cell areas in the storage device is less than a preset number, if a newly storable data amount for the storage device is more than a predetermined threshold amount.

By virtue of this, when the newly storable data amount is more than a threshold amount in the storage device, it is possible to increase the number of cell areas up to a preset number.

In this case, the information processing apparatus preferably further includes a cell area extinguishment processing means for carrying out a process to delete the first cell area from the cell areas for the storage processing means to store the data when the first cell area in the storage device has stored a first hash value identical to the first hash value which is one of the acquired hash values and a second hash value different from the second hash value which is other one of the acquired hash values in correlation with each other.

In this case, it is preferable that the data included in the write request be a segment as a data block generated by dividing a series of data dealt with as a file by a predetermined data size.

By virtue of this, when only a part of the file overlaps, it is possible to prevent the overlapped part from being repeatedly stored in the storage device. As a result, it is possible to further reduce the data amount stored in the storage device.

Further, in accordance with another aspect of the present invention, an information processing system includes: a storage device; a write request acceptance means for accepting a write request including a data; a hash value acquisition means for carrying out a process to acquire a first hash value by inputting the data included in the write request to a first hash function and to acquire a second hash value by inputting the data to a second hash function, when the write request is accepted; and a storage processing means for correlating the data included in the write request, the acquired first hash value, the acquired second hash value, and information of referenced times denoting a predetermined initial value as the number of times the data has been referenced, and newly storing the correlated items into the storage device when the storage device has not stored a first hash value identical to the acquired first hash value and a second hash value identical to the acquired second hash value in correlation with each other, whereas changing the information of referenced times stored in correlation with the first hash value and the second hash value such as to add one to the number of times denoted by the information of referenced times when the storage device has stored a first hash value identical to the acquired first hash value and a second hash value identical to the acquired second hash value in correlation with each other.

In this case, the information processing system preferably further includes a hash function change processing means for carrying out a process to change the hash function utilized for the hash value acquisition means to acquire the first hash value thereafter from the first hash function to a fourth hash function different from the first hash function when the storage device has stored a first hash value identical to the acquired first hash value and a second hash value different from the acquired second hash value in correlation with each other.

Further, in accordance with still another aspect of the present invention, an information processing method includes: accepting a write request including a data; carrying out a process to acquire a first hash value by inputting the data included in the write request to a first hash function and to acquire a second hash value by inputting the data to a second hash function, when the write request is accepted; and correlating the data included in the write request, the acquired first hash value, the acquired second hash value, and information of referenced times denoting a predetermined initial value as the number of times the data has been referenced, and newly storing the correlated items into a storage device when the storage device has not stored a first hash value identical to the acquired first hash value and a second hash value identical to the acquired second hash value in correlation with each other, whereas changing the information of referenced times stored in correlation with the first hash value and the second hash value such as to add one to the number of times denoted by the information of referenced times when the storage device has stored a first hash value identical to the acquired first hash value and a second hash value identical to the acquired second hash value in correlation with each other.

In this case, it is preferable that the information processing method be configured to carry out a process to change the hash function utilized for acquiring the first hash value thereafter from the first hash function to a fourth hash function different from the first hash function when the storage device has stored a first hash value identical to the acquired first hash value and a second hash value different from the acquired second hash value in correlation with each other.

Further, in accordance with still another aspect of the present invention, a computer program includes instructions for causing an information processing apparatus to realize: a write request acceptance means for accepting a write request including a data; a hash value acquisition means for carrying out a process to acquire a first hash value by inputting the data included in the write request to a first hash function and to acquire a second hash value by inputting the data to a second hash function, when the write request is accepted; and a storage processing means for correlating the data included in the write request, the acquired first hash value, the acquired second hash value, and information of referenced times denoting a predetermined initial value as the number of times the data has been referenced, and newly storing the correlated items into a storage device when the storage device has not stored a first hash value identical to the acquired first hash value and a second hash value identical to the acquired second hash value in correlation with each other, whereas changing the information of referenced times stored in correlation with the first hash value and the second hash value such as to add one to the number of times denoted by the information of referenced times when the storage device has stored a first hash value identical to the acquired first hash value and a second hash value identical to the acquired second hash value in correlation with each other.

In this case, the computer program preferably further includes instructions for causing the information processing apparatus to realize a hash function change processing means for carrying out a process to change the hash function utilized for the hash value acquisition means to acquire the first hash value thereafter from the first hash function to a fourth hash function different from the first hash function when the storage device has stored a first hash value identical to the acquired first hash value and a second hash value different from the acquired second hash value in correlation with each other.

Any invention of information processing systems, information processing methods or computer programs with the configurations described hereinabove is able to achieve the aforementioned object of the present invention because it has the same function as that of the above information processing apparatus.

Hereinabove, the present invention was described with reference to each of the above exemplary embodiments. However, the present invention is not limited to the exemplary embodiments described hereinabove. It is possible to apply various changes understandable to those skilled in the art to the configurations and details of the present invention without departing from the true spirit and scope of the present invention.

For example, in the above exemplary embodiments, the information processing system 1 is provided with the information processing apparatus 100 and the external storage device 110 as two units independent of each other. However, it may also be provided with a single unit including the information processing apparatus 100 and the external storage device 110. Further, the information stored in the internal storage device of the information processing apparatus 100 may also be stored in the external storage device 110.

Further, in the above exemplary embodiments, the information processing system 1 includes one external storage device 110. However, it may also include a plurality of external storage devices 110. In addition, in the above exemplary embodiments, the maximum number of the utilizing cell areas is three. However, it may also be one, two, or more than three. In the same manner, the number of the hash functions utilized for one cell area may also be more than two.

Further, in each of the above exemplary embodiments, the computer program is stored in the storage device. However, it may also be stored in a computer-readable recording medium. The recording medium is, for example, a portable medium such as a flexible disk, an optical disk, a magneto-optical disk, a semiconductor memory, and the like.

Further, as other modifications of the above exemplary embodiments, they may adopt any combinations of the exemplary embodiments and modifications described hereinabove.

INDUSTRIAL APPLICABILITY

It is possible to apply the present invention to storage systems and the like including a plurality of storage devices for storing data.

The invention claimed is:

1. An information processing apparatus including a Central Processing Unit (CPU) and comprising:
    a write request acceptance unit for accepting a write request including a data;
    a hash value acquisition unit for carrying out a process to acquire a first hash value by inputting the data included in the write request to a first hash function and to acquire a second hash value by inputting the data to a second hash function, when the write request is accepted;
    a storage processing unit for correlating the data included in the write request, the acquired first hash value, the acquired second hash value, and information of referenced times denoting a predetermined initial value as the number of times the data has been referenced, and newly storing the correlated items into a storage device when the storage device has not stored a first hash value identical to the acquired first hash value and a second hash value identical to the acquired second hash value in correlation with each other, whereas changing the information of referenced times stored in correlation with the first hash value and the second hash value such so as to add one to the number of times denoted by the information of referenced times when the storage device has stored a first hash value identical to the acquired first hash value and a second hash value identical to the acquired second hash value in correlation with each other; and
    a hash function change processing unit which carries out a process to change the hash function utilized for the hash value acquisition unit to acquire the first hash value thereafter from the first hash function to a fourth hash function different from the first hash function when the storage device has stored a first hash value identical to the acquired first hash value and a second hash value different from the acquired second hash value in correlation with each other.

2. The information processing apparatus according to claim 1, wherein the first hash function is configured to output a hash value outputted from a first basic hash function by inputting a data composed of the inputted data and a predetermined first additional data to the first basic hash function which is a hash function as the base; and the second hash function is configured to output a hash value outputted from a second basic hash function by inputting a data composed of the inputted data and a predetermined second additional data different from the first additional data to the second basic hash function which is a hash function as the base.

3. The information processing apparatus according to claim 1, wherein the storage processing unit is configured to store the data included in the write request into each of a plurality of cell areas in the storage device in the event of storing the data into the storage device.

4. The information processing apparatus according to claim 1, wherein the data included in the write request is a segment as a data block generated by dividing a series of data dealt with as a file by a predetermined data size.

5. An information processing apparatus including a CPU and comprising:
 a write request acceptance unit which accepts a write request including a data;
 a hash value acquisition unit which carries out a process to acquire a first hash value by inputting the data included in the write request to a first hash function and to acquire a second hash value by inputting the data to a second hash function, when the write request is accepted; and
 a storage processing unit which correlates the data included in the write request, the acquired first hash value, the acquired second hash value, and information of referenced times denoting a predetermined initial value as the number of times the data has been referenced, and newly storing the correlated items into a storage device when the storage device has not stored a first hash value identical to the acquired first hash value and a second hash value identical to the acquired second hash value in correlation with each other, whereas changing the information of referenced times stored in correlation with the first hash value and the second hash value so as to add one to the number of times denoted by the information of referenced times when the storage device has stored a first hash value identical to the acquired first hash value and a second hash value identical to the acquired second hash value in correlation with each other;
 wherein:
  the storage processing unit is configured to store the data included in the write request into each of a plurality of cell areas in the storage device in the event of storing the data into the storage device;
  the hash value acquisition unit is configured to carry out the process to acquire the hash values by inputting the data included in the write request to each of at least three hash functions different from one another when the write request is accepted; and
  the storage processing unit is configured to store the data in correlation with at least two hash values among the acquired hash values into each of the plurality of cell areas in the event of storing the data included in the write request into the storage device such that one hash value correlated with the data and stored in a first cell area which is an arbitrary one of the plurality of cell areas is correlated with the data and stored in a second cell area other than the first cell area, and the other hash value correlated with the data and stored in the first cell area is correlated with the data and stored in a third cell area other than the first cell area and the second cell area.

6. The information processing apparatus according to claim 5, further comprising a cell area generation processing unit which carries out a process to increase the number of cell areas for the storage processing unit to store the data when the number of cell areas in the storage device is less than a preset number, and when a newly storable data amount for the storage device is more than a predetermined threshold amount.

7. The information processing apparatus according to claim 5, further comprising a cell area extinguishment processing unit which carries out a process to delete the first cell area from the cell areas for the storage processing unit to store the data when the first cell area in the storage device has stored a first hash value identical to the first hash value which is one of the acquired hash values and a second hash value different from the second hash value which is other one of the acquired hash values, in correlation with each other.

8. An information processing system including a CPU and comprising:
 a storage device including a storage medium which stores information;
 a write request acceptance unit which accepts a write request including a data;
 a hash value acquisition unit which carries out a process to acquire a first hash value by inputting the data included in the write request to a first hash function and to acquire a second hash value by inputting the data to a second hash function, when the write request is accepted;
 a storage processing unit which correlates the data included in the write request, the acquired first hash value, the acquired second hash value, and information of referenced times denoting a predetermined initial value as the number of times the data has been referenced, and newly storing the correlated items into the storage device when the storage device has not stored a first hash value identical to the acquired first hash value and a second hash value identical to the acquired second hash value in correlation with each other, whereas changing the information of referenced times stored in correlation with the first hash value and the second hash value such so as to add one to the number of times denoted by the information of referenced times when the storage device has stored a first hash value identical to the acquired first hash value and a second hash value identical to the acquired second hash value in correlation with each other; and
 a hash function change processing unit which carries out a process to change the hash function utilized for the hash value acquisition unit to acquire the first hash value thereafter from the first hash function to a fourth hash function different from the first hash function when the storage device has stored a first hash value identical to the acquired first hash value and a second hash value different from the acquired second hash value in correlation with each other.

9. An information processing method comprising:
 accepting a write request including a data;
 carrying out a process to acquire a first hash value by inputting the data included in the write request to a first hash function and to acquire a second hash value by inputting the data to a second hash function, when the write request is accepted;
 correlating the data included in the write request, the acquired first hash value, the acquired second hash value, and information of referenced times denoting a predetermined initial value as the number of times the data has been referenced, and newly storing the correlated items into a storage device when the storage device has not stored a first hash value identical to the acquired first hash value and a second hash value identical to the acquired second hash value in correlation with each other, whereas changing the information of referenced times stored in correlation with the first hash value and the second hash value so as to add one to the number of times denoted by the information of referenced times when the storage device has stored a first hash value identical to the acquired first hash value and a second hash value identical to the acquired second hash value in correlation with each other, and carrying out a process to change the hash function utilized for acquiring the first hash value thereafter from the first hash function to a fourth hash function different from the first hash function when the storage device has stored a first hash value identical to the acquired first hash value and a second hash value different from the acquired second hash value in correlation with each other.

* * * * *